US012151730B2

(12) United States Patent
Bedford

(10) Patent No.: US 12,151,730 B2
(45) Date of Patent: Nov. 26, 2024

(54) VEHICLE CART ASSEMBLY

(71) Applicant: Marlin Bedford, Crawfordsville, AR (US)

(72) Inventor: Marlin Bedford, Crawfordsville, AR (US)

( * ) Notice: Subject to any disclaimer, the term of this patent is extended or adjusted under 35 U.S.C. 154(b) by 191 days.

(21) Appl. No.: 18/095,599

(22) Filed: Jan. 11, 2023

(65) Prior Publication Data

US 2024/0227897 A1 Jul. 11, 2024

(51) Int. Cl.
*B62B 3/10* (2006.01)
*B62B 3/00* (2006.01)
*B62B 3/04* (2006.01)
*B62B 5/00* (2006.01)
*G08B 21/18* (2006.01)

(52) U.S. Cl.
CPC ............... *B62B 3/10* (2013.01); *B62B 3/008* (2013.01); *B62B 3/04* (2013.01); *B62B 5/00* (2013.01); *B62B 2202/90* (2013.01); *B62B 2203/00* (2013.01); *G08B 21/18* (2013.01)

(58) Field of Classification Search
CPC .. B62B 3/10; B62B 3/008; B62B 3/04; B62B 5/00; B62B 2202/90; B62B 2203/00; B62B 2202/031; G08B 21/18; G08B 5/36; B60S 13/00; B60P 1/43; B60P 3/075

See application file for complete search history.

(56) References Cited

U.S. PATENT DOCUMENTS

| | | | | |
|---|---|---|---|---|
| 2,414,383 A | * | 1/1947 | Merriam | B66F 7/246 70/237 |
| 3,145,860 A | * | 8/1964 | Graves | B62H 1/12 193/41 |
| 3,224,611 A | * | 12/1965 | Smuck | B66F 7/246 414/430 |
| 3,947,055 A | | 3/1976 | Allen | |
| 4,465,421 A | * | 8/1984 | Murillo | B66F 7/246 414/430 |
| 4,726,727 A | * | 2/1988 | Tyler | B66F 7/246 188/4 R |

(Continued)

FOREIGN PATENT DOCUMENTS

CN 105799665 A * 7/2016
CN 108189816 A * 6/2018 ............. B60S 13/00

(Continued)

*Primary Examiner* — James A Shriver, II
*Assistant Examiner* — Ian Bryce Shelton

(57) ABSTRACT

A vehicle cart assembly includes a cart that has a panel and a plurality of rollers rotatably disposed on the panel. A ramp is hingedly attached to the panel to facilitate a tire of a vehicle to roll onto the cart. A first pressure sensor is integrated into the ramp which is engaged by the tire of the vehicle when the tire of the vehicle rolls onto the ramp. A second pressure sensor is integrated into the panel to be engaged by the tire of the vehicle when the tire of the vehicle rolls onto the panel. A visual alert is removably attached to the panel which is turned on when the first pressure sensor is engaged to alert a driver that the tire of the vehicle has begun rolling onto the ramp. The visual alert is turned off when the second pressure sensor is engaged to alert the driver that the tire has rolled onto the panel thereby alerting the driver to stop the vehicle.

7 Claims, 7 Drawing Sheets

(56) References Cited

U.S. PATENT DOCUMENTS

| | | | | |
|---|---|---|---|---|
| 5,039,123 | A * | 8/1991 | Smeitink | B66F 7/246 |
| | | | | 280/37 |
| 5,248,235 | A * | 9/1993 | Poten | B66F 7/246 |
| | | | | 280/43.11 |
| 5,249,907 | A * | 10/1993 | Poten | B66F 7/246 |
| | | | | 280/43.11 |
| 6,199,236 | B1 * | 3/2001 | Mullins | B66F 7/243 |
| | | | | 254/88 |
| 6,390,759 | B1 * | 5/2002 | Novak | B62B 5/049 |
| | | | | 414/469 |
| 7,226,265 | B2 * | 6/2007 | Wilson | B65G 69/005 |
| | | | | 340/436 |
| 7,543,830 | B2 | 6/2009 | Aymiczek | |
| D600,873 | S | 9/2009 | Banasik | |
| 7,607,608 | B2 * | 10/2009 | Morris | B62B 3/00 |
| | | | | 244/50 |
| 8,882,434 | B2 | 11/2014 | LaBruyere | |
| 9,212,797 | B2 * | 12/2015 | Jeong | B65G 69/005 |
| 9,931,972 | B2 | 4/2018 | Larsen | |
| 11,260,992 | B1 * | 3/2022 | Wiskus | B64F 1/227 |
| 2003/0021661 | A1 * | 1/2003 | Fluss | B62B 5/049 |
| | | | | 414/430 |
| 2003/0038439 | A1 * | 2/2003 | Novak | B62B 5/049 |
| | | | | 280/79.7 |
| 2005/0017470 | A1 * | 1/2005 | Abbott | B60P 3/127 |
| | | | | 280/79.4 |
| 2007/0166137 | A1 * | 7/2007 | Toal | B66F 7/246 |
| | | | | 414/430 |
| 2009/0191035 | A1 * | 7/2009 | LaBruyere | B62B 5/0083 |
| | | | | 414/427 |
| 2010/0092270 | A1 * | 4/2010 | Adams | B60B 29/002 |
| | | | | 414/427 |
| 2013/0223048 | A1 * | 8/2013 | Jeong | F21S 9/02 |
| | | | | 362/183 |
| 2015/0259077 | A1 * | 9/2015 | Wiskus | B64F 1/22 |
| | | | | 414/800 |
| 2017/0203943 | A1 * | 7/2017 | Winston | B66F 7/246 |
| 2017/0259863 | A1 * | 9/2017 | Ferderber | B62H 3/08 |
| 2018/0142488 | A1 * | 5/2018 | Boussard | E04H 6/36 |
| 2020/0291671 | A1 * | 9/2020 | Bobenrieth | E04H 6/426 |
| 2020/0298806 | A1 * | 9/2020 | Friend | B62B 3/104 |
| 2021/0117950 | A1 * | 4/2021 | Bentsur | G01G 19/08 |
| 2024/0083395 | A1 * | 3/2024 | Fluss | B62B 3/10 |
| 2024/0102307 | A1 * | 3/2024 | Cord | E04H 6/305 |

FOREIGN PATENT DOCUMENTS

| | | | |
|---|---|---|---|
| KR | 20100129408 A | * 12/2010 | |
| KR | 20100129830 A | * 12/2010 | |
| WO | WO2005075336 | 8/2005 | |
| WO | WO-2005075336 A1 | * 8/2005 | B66F 7/246 |
| WO | WO-2006053583 A1 | * 5/2006 | B60S 13/00 |

* cited by examiner

VEHICLE CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

(1) Field of the Invention

The disclosure relates to cart devices and more particularly pertains to a new cart device for lifting a tire of a vehicle from the ground. The device includes a cart and a ramp attached to the cart to facilitate a tire of a vehicle to be rolled onto the cart. The device includes a visual alert that is removably attached to the cart. A first pressure sensor is attached to the ramp and a second pressure sensor is attached to the panel. The visual alert is turned on when the tire rolls over the first pressure sensor and the visual alert is turned off when the tire rolls over the second pressure sensor.

(2) Description of Related Art Including Information Disclosed Under 37 CFR 1.97 and 1.98

The prior art relates to cart devices including a variety of cart devices that each at least includes a ramp to facilitate a tire of a vehicle to be rolled onto the cart. The prior art discloses a variety of carts that are structured to accommodate a tire of a vehicle in a manner to inhibit the tire from rolling off of the cart. The prior art discloses a vehicle cart that includes a ramp, rollers and a strap that can be extended over a tire that is rolled onto the cart. In no instance does the prior art discloses a vehicle cart that includes a visual alert to alert a driver of a vehicle that the vehicle has been fully driven onto the vehicle cart.

BRIEF SUMMARY OF THE INVENTION

An embodiment of the disclosure meets the needs presented above by generally comprising a cart that has a panel and a plurality of rollers is rotatably disposed on the panel. A ramp is hingedly attached to the panel to facilitate a tire of a vehicle to roll onto the cart. A first pressure sensor is integrated into the ramp which is engaged by the tire of the vehicle when the tire of the vehicle rolls onto the ramp. A second pressure sensor is integrated into the panel to be engaged by the tire of the vehicle when the tire of the vehicle rolls onto the panel. A visual alert is removably attached to the panel which is turned on when the first pressure sensor is engaged to alert a driver that the tire of the vehicle has begun rolling onto the ramp. The visual alert is turned off when the second pressure sensor is engaged to alert the driver that the tire has rolled onto the panel thereby alerting the driver to stop the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
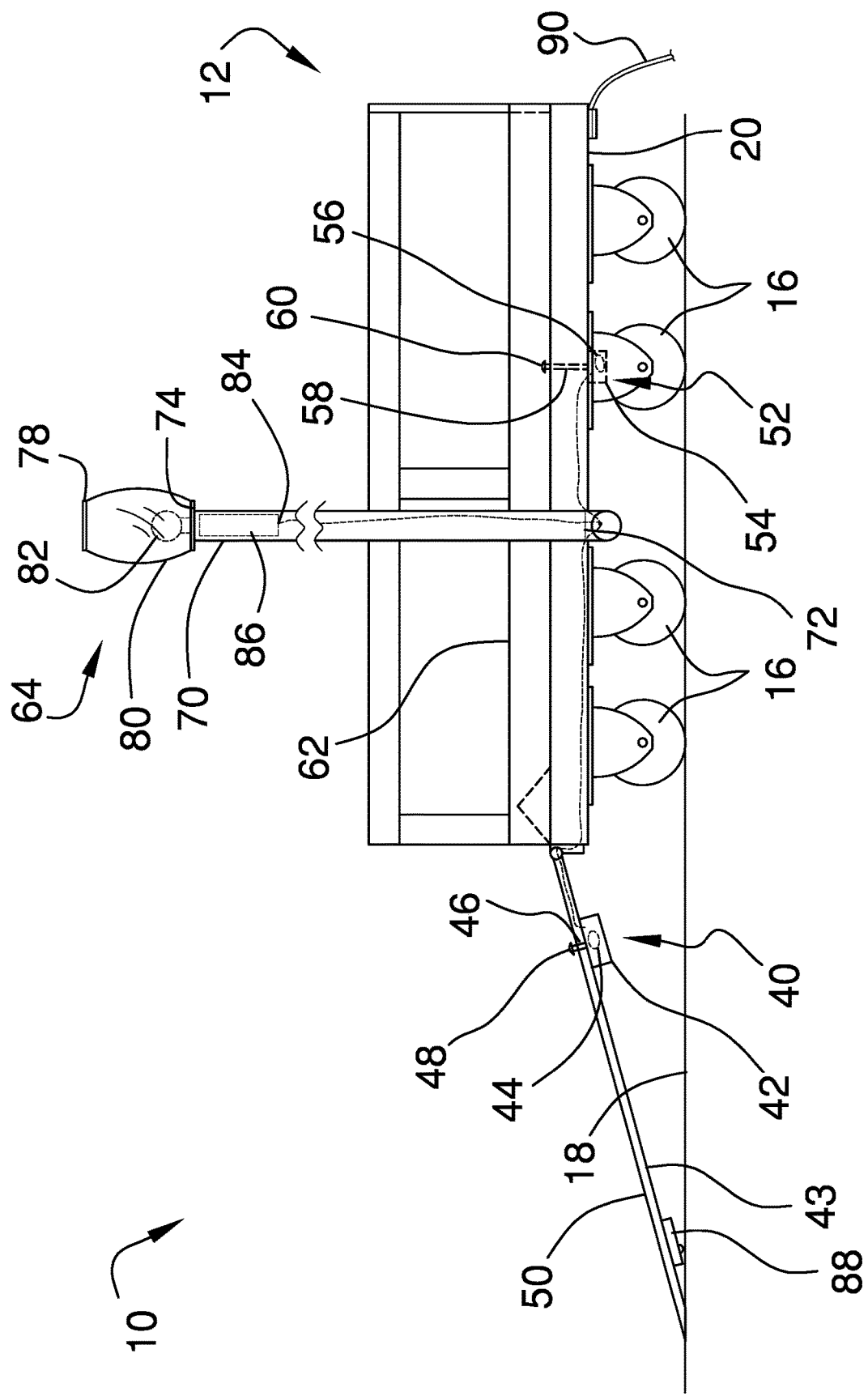
FIG. 1 is a right side phantom view of a vehicle cart assembly according to an embodiment of the disclosure.
Figure 2:
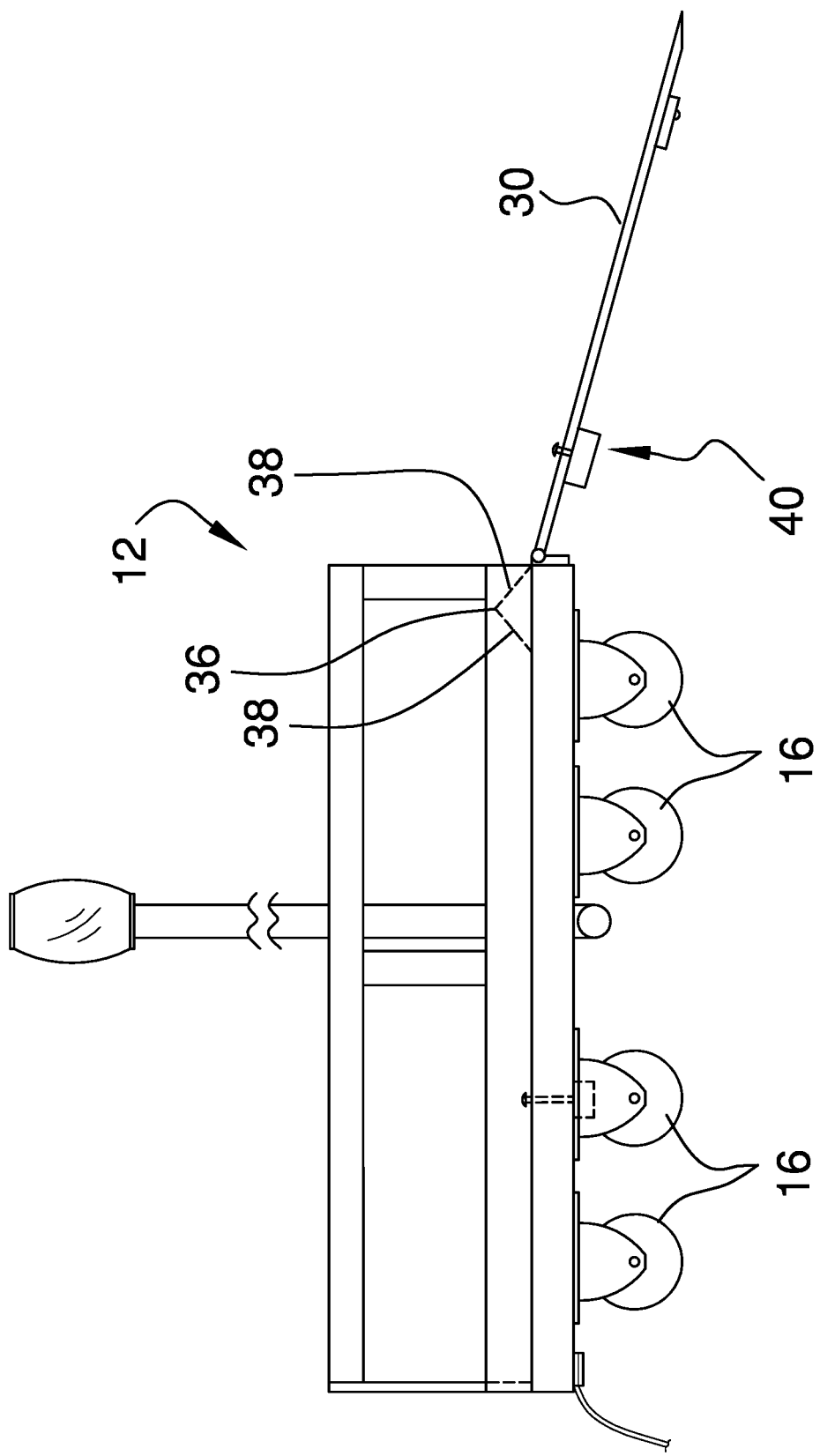
FIG. 2 is a left side view of an embodiment of the disclosure.
Figure 4:
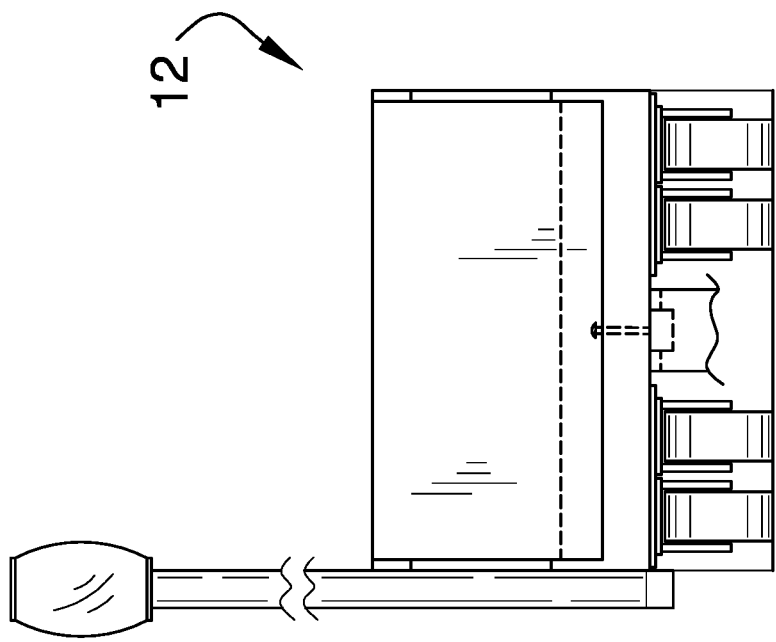
FIG. 4 is a front view of an embodiment of the disclosure.
Figure 3:
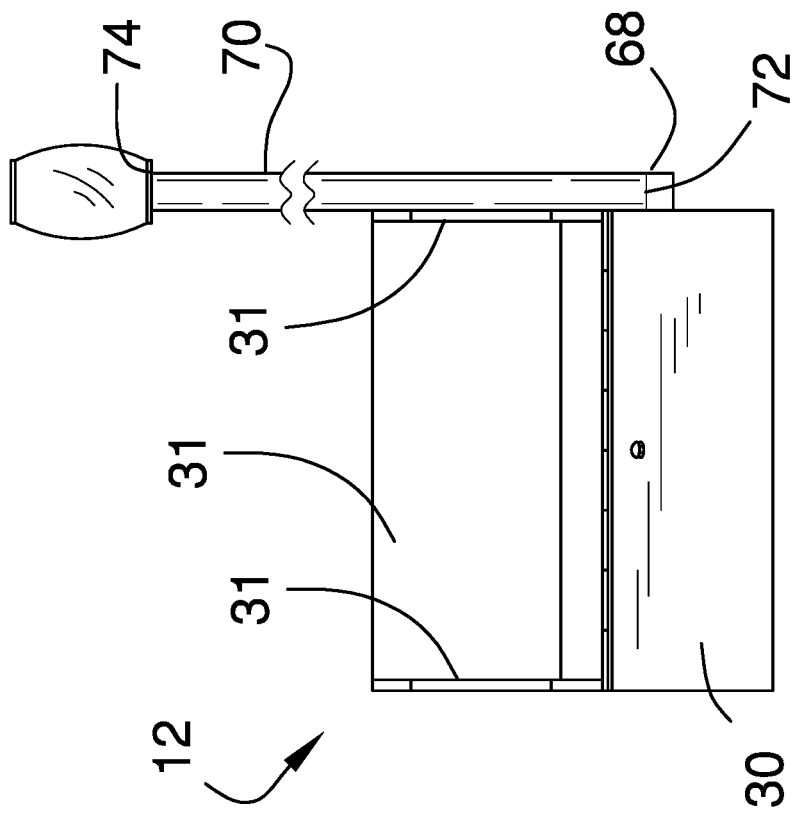
FIG. 3 is a back view of an embodiment of the disclosure.
Figure 5:
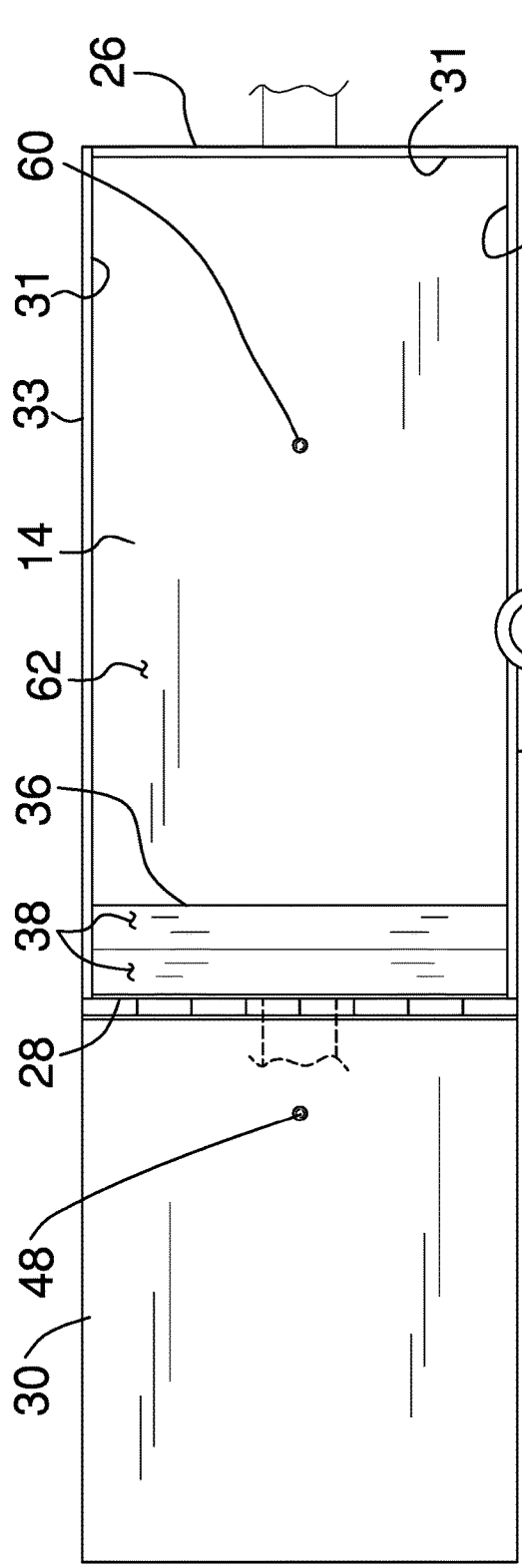
FIG. 5 is a top view of an embodiment of the disclosure.
Figure 6:
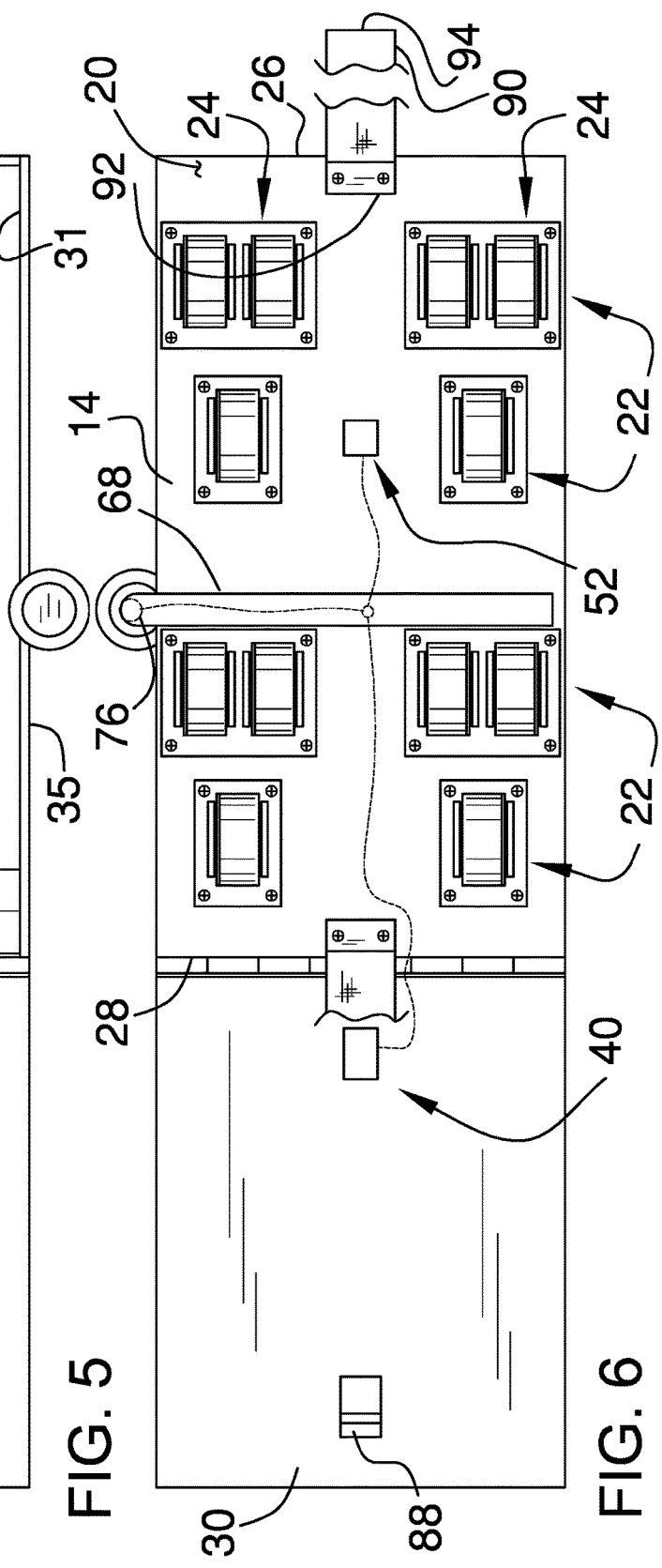
FIG. 6 is a bottom phantom view of an embodiment of the disclosure.
Figure 7:
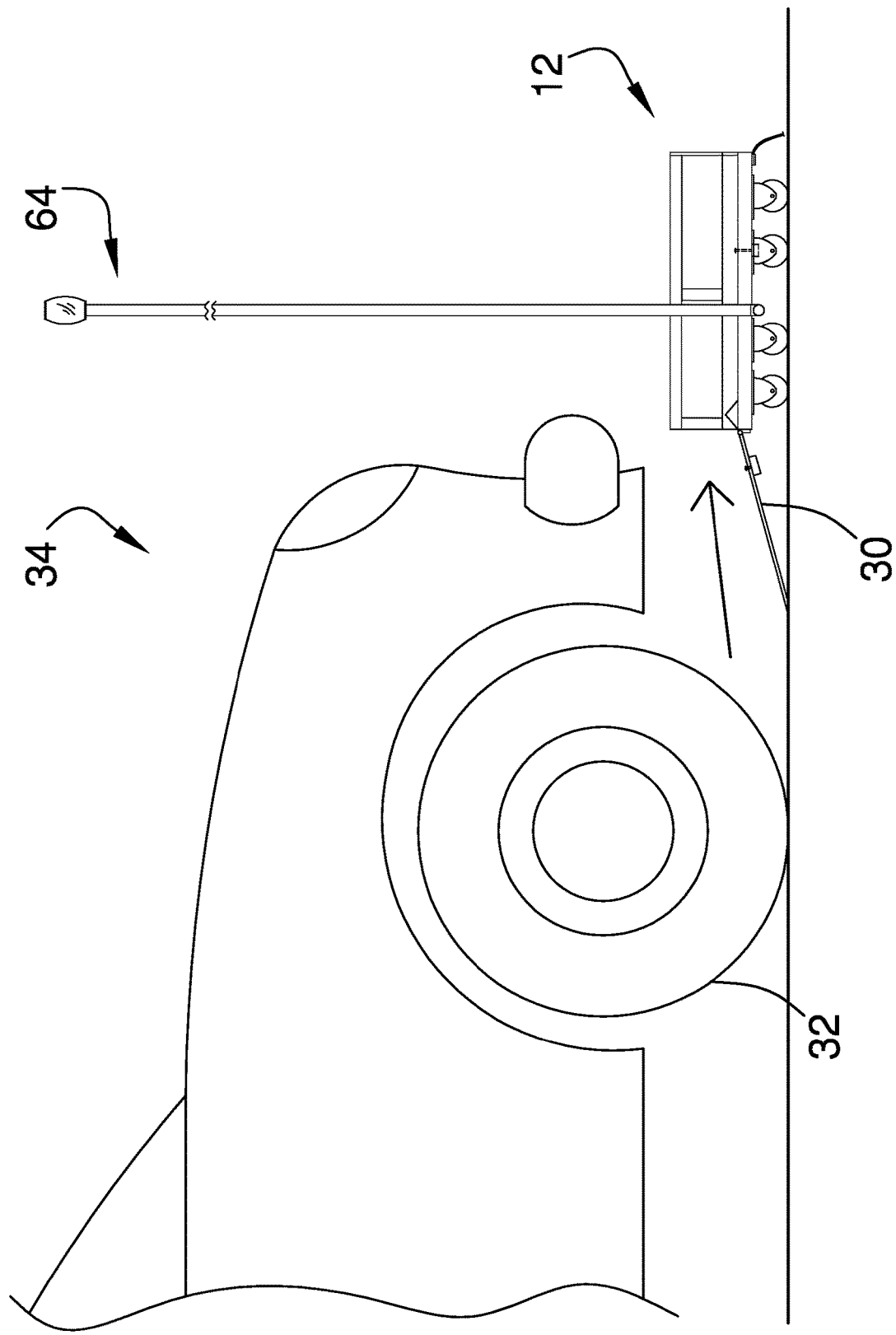
FIG. 7 is a perspective in-use view of an embodiment of the disclosure showing a vehicle approaching a ramp on a cart.
Figure 8:
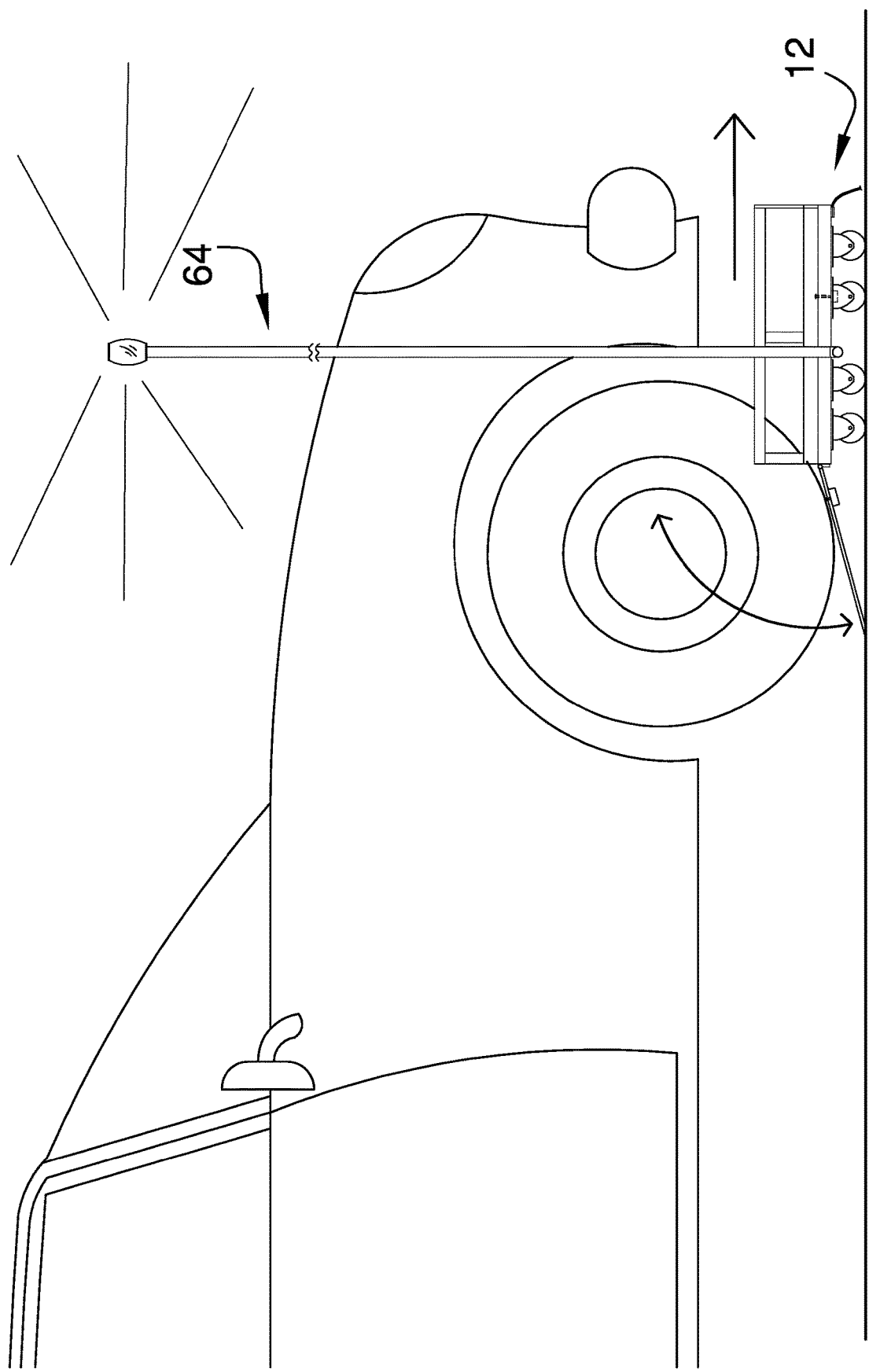
FIG. 8 is a perspective in-use view of an embodiment of the disclosure showing a visual alert being turned on as a vehicle drives onto a ramp on a cart.
Figure 9:
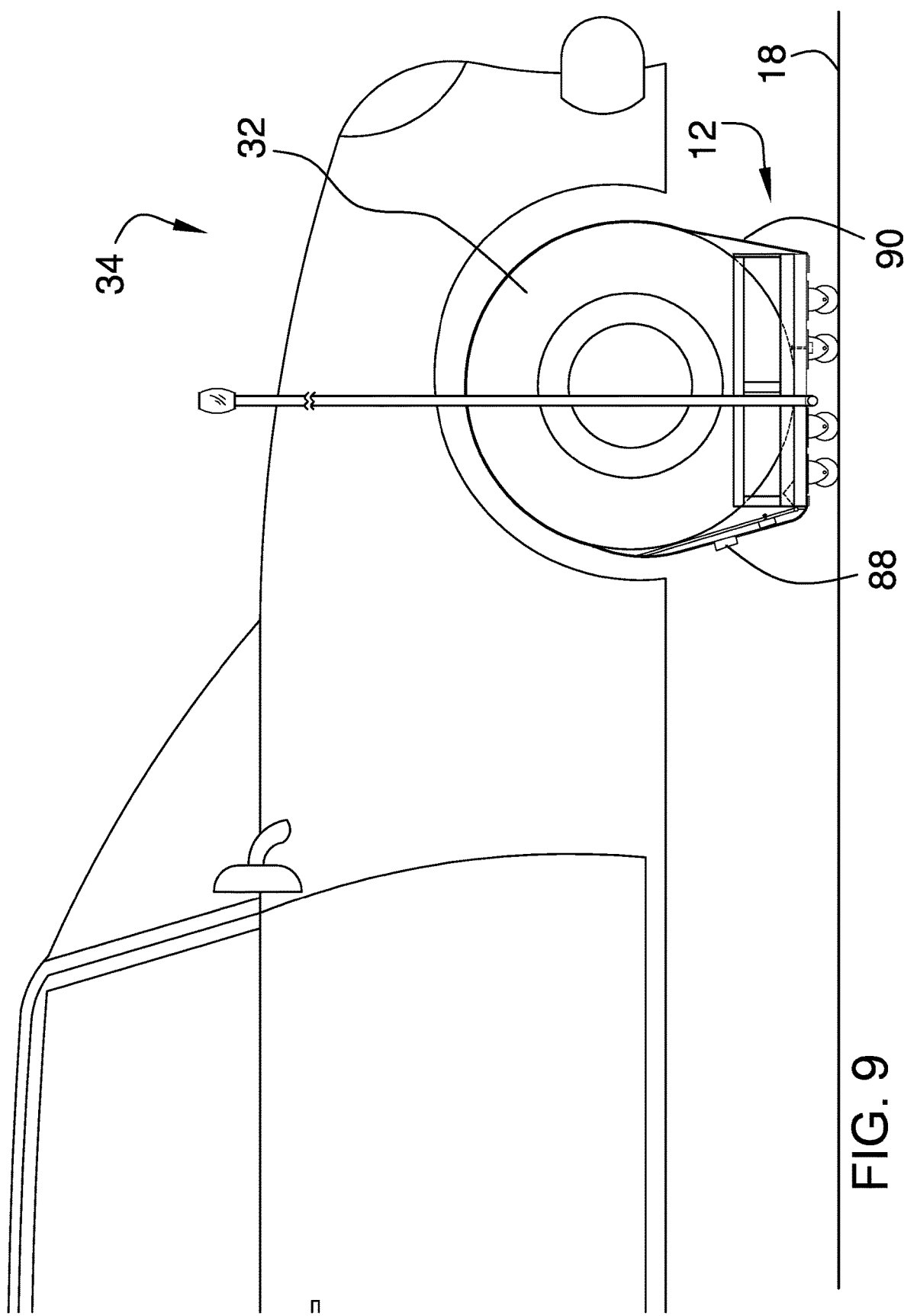
FIG. 9 is a perspective in-use view of an embodiment of the disclosure showing a vehicle being fully seated on a cart.

With reference now to the drawings, and in particular to FIGS. 1 through 9 thereof, a new cart device embodying the principles and concepts of an embodiment of the disclosure and generally designated by the reference numeral 10 will be described.

As best illustrated in FIGS. 1 through 9, the vehicle cart assembly 10 generally comprises a cart 12 that has a panel 14 and a plurality of rollers 16 rotatably disposed on the panel 14 thereby facilitating the plurality of rollers 16 to be positioned on a support surface 18 having the panel 14 being spaced from the support surface 18. The plurality of rollers 16 is disposed on a bottom surface 20 of the panel 14 and the plurality of rollers 16 includes a plurality of sets of rollers 22. The plurality of sets of rollers 22 is arranged in a pair of rows 24 which each extends substantially between a front end 26 and a back end 28 of the panel 14. Furthermore, the panel 14 is comprised of a rigid material, such as steel for example, that is capable of supporting at least 400.0 kg. Additionally, the plurality of rollers 16 may comprise casters that, combined, can support at least 400.0 kg while still rolling freely. The support surface 18 may be a roadway, for example, or other surface upon which a motorized vehicle may be travelling.

A ramp 30 is provided and the ramp 30 is hingedly attached to the panel 14. The ramp 30 is positionable in a deployed position having the ramp 30 angling between the panel 14 and the support surface 18 to facilitate a tire 32 of a vehicle 34 to roll onto the cart 12. The ramp 30 is positionable in a stored position having the ramp 30 extending upwardly from the panel 14. Additionally, the ramp 30 is hingedly attached to the back end 28 of the panel 14. The vehicle 34 may be a passenger vehicle, a cargo vehicle or any other motorized vehicle that is driven on public roadways. A plurality of barriers 31 each extends upwardly from the panel 14 and each of the barriers 31 extends along a respective one of the front end 26, a first lateral side 33 and a second lateral side 35 of the panel 14.

A wheel chock 36 is attached to the panel 14 to inhibit the tire 32 of the vehicle 34 from rolling off of the panel 14. The wheel chock 36 is positioned on a top surface 38 of the panel 14 and the wheel chock 36 is positioned adjacent to the back end 28 of the panel 14. The wheel chock 36 has a pair of exterior surfaces 38 which each angle upwardly from the top surface 38 of the panel 14 and intersect each other at a point such that the wheel chock 36 has a triangular shape. Additionally, the wheel chock 36 extends laterally across the panel 14.

A first pressure sensor 40 is integrated into the ramp 30 such that the first pressure sensor 40 is engaged by the tire 32 of the vehicle 34 when the tire 32 of the vehicle 34 rolls onto the ramp 30. The first pressure sensor 40 comprises a first control housing 42 that is attached to a bottom surface 43 of the ramp 30. The first pressure sensor 40 includes a first switch 44 that is positioned within the first control housing 42 and the first switch 44 is biased into an off position. The first pressure sensor 40 includes a first pin 46 which extends upwardly from the first control housing 42 and which extends through the ramp 30 such that a head 48 of the first pin 46 that is spaced from a top surface 50 of the ramp 30. The first pin 46 is depressed into the first control housing 42 when the first pin 46 is engaged such that the first switch 44 is urged into an on position.

A second pressure sensor 52 is integrated into the panel 14 such that the second pressure sensor 52 can be engaged by the tire 32 of the vehicle 34 when the tire 32 of the vehicle 34 rolls onto the panel 14. The second pressure sensor 52 comprises a second control housing 54 that is attached to the bottom surface 20 of the panel 14. The second pressure sensor 52 includes a second switch 56 that is positioned within the second control housing 54 and the second switch 56 is biased into an off position. The second pressure sensor 52 includes a second pin 58 which extends upwardly from the second control panel 14 and which extends through the panel 14 such that a head 60 of the second pin 58 is spaced from a top surface 62 of the panel 14. The second pin 58 is depressed into the second control housing 54 when the second pin 58 is engaged such that the second switch 56 is urged into an on position.

A visual alert 64 is removably attached to the panel 14 and the visual alert 64 is in communication with the first pressure sensor 40 and the second pressure sensor 52. The visual alert 64 is turned on when the first pressure sensor 40 is engaged. In this way a driver 66 of the vehicle 34 is alerted that the tire 32 of the vehicle 34 has begun rolling onto the ramp 30. The visual alert 64 is turned off when the second pressure sensor 52 is engaged. In this way the driver 66 is alerted that the tire 32 has rolled onto the panel 14 thereby alerting the driver 66 to stop the vehicle 34.

The visual alert 64 comprises a socket 68 that is attached to the panel 14 and the socket 68 is electrically coupled to each of the first switch 44 and the second switch 56. The visual alert 64 includes a pole 70 that has a lower end 72 and an upper end 74 and the pole 70 has a contact 76 that is attached to the lower end 72. The pole 70 is insertable into the socket 68 having the contact 76 being in electrical communication with the socket 68. The visual alert 64 includes a light fixture 78 that is attached to the upper end 74 of the pole 70 such that the light fixture 78 is visible to the driver 66 when the pole 70 is inserted into the socket 68. The light fixture 78 includes a lens 80 which is comprised of a translucent material to pass light though the lens 80.

The visual alert 64 includes a light emitter 82 that is positioned within the light fixture 78 to emit light outwardly through the lens 80 when the light emitter 82 is turned on. The light emitter 82 is electrically coupled to the contact 76 on the lower end 72 of the pole 70 and the light emitter 82 is turned on when the first switch 44 is urged into the on position. Conversely, the light emitter 82 is turned off when the second switch 56 is urged into the on position. The visual alert 64 includes a power supply 84 that is positioned within the pole 70. The power supply 84 is electrically coupled to the light emitter 82 and the power supply 84 comprises at least one battery 86.

A clamp 88 is attached to the ramp 30 and the clamp 88 is positioned on the bottom surface 43 of the ramp 30. The clamp 88 may include a jaw that can be positioned between an open position and a closed position or the clamp 88 may include a fixed mechanism. A strap 90 is coupled to the cart 12 and the strap 90 is insertable through the clamp 88 when the ramp 30 is in the stored position has the strap 90 forming a closed loop. In this way the strap 90 can be extended over the tire 32 of the vehicle 34 for securing the tire 32 of the vehicle 34 to the cart 12. The strap 90 has a first end 92 that is attached to the bottom surface 20 of the panel 14 at a point located adjacent to the front end 26 of the panel 14 and a second end 94 of the strap 90 is threadable through the clamp 88.

In use, the cart 12 is placed on the support surface 18, the ramp 30 is positioned in the deployed position and the pole 70 of the visual alert 64 is plugged into the socket 68. The vehicle 34 is driven onto the ramp 30 and the light emitter 82 on the visual alert 64 is turned on when the tire 32 of the vehicle 34 engages the first pin 46. In this way the driver 66 is alerted that the tire 32 of the vehicle 34 has begun rolling onto the ramp 30. The driver 66 continues driving forward until the tire 32 of the vehicle 34 engages the second pin 58 thereby turning off the light emitter 82. In this way the driver 66 is alerted that the tire 32 of the vehicle 34 is positioned on the panel 14 and that the driver 66 should stop the vehicle 34. The panel 14 is positioned in the stored position, the strap 90 is extended over the tire 32 and the strap 90 is threaded through the clamp 88 to secure the strap 90 around the tire 32. In this way a person that does not have the skill to place the vehicle 34 on a jack, for example, can safely drive the vehicle 34 onto the panel 14 to subsequently be serviced by a qualified professional.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle cart assembly for facilitating a tire of a vehicle to be lifted off of a roadway, said assembly comprising:
   a cart having a panel and a plurality of rollers being rotatably disposed on said panel thereby facilitating said plurality of rollers to be positioned on a support surface having said panel being spaced from the support surface;
   a ramp being hingedly attached to said panel, said ramp being positionable in a deployed position having said ramp angling between said panel and the support surface wherein said ramp is configured to facilitate a tire of a vehicle to roll onto said cart, said ramp being positionable in a stored position having said ramp extending upwardly from said panel;
   a wheel chock being attached to said panel wherein said wheel chock is configured to inhibit the tire of the vehicle from rolling off of said panel;
   a first pressure sensor being integrated into said ramp wherein said first pressure sensor is configured to be engaged by the tire of the vehicle when the tire of the vehicle rolls onto said ramp;
   a second pressure sensor being integrated into said panel wherein said second pressure sensor is configured to be engaged by the tire of the vehicle when the tire of the vehicle rolls onto said panel;
   a visual alert being removably attached to said panel, said visual alert being in communication with said first pressure sensor and said second pressure sensor, said visual alert being turned on when said first pressure sensor is engaged wherein said visual alert is configured to alert a driver that the tire of the vehicle has begun rolling onto said ramp, said visual alert being turned off when said second pressure sensor is engaged wherein said visual alert is configured to alert the driver that the tire has rolled onto said panel thereby alerting the driver to stop the vehicle;
   a clamp being attached to said ramp; and
   a strap being coupled to said cart, said strap being insertable through said clamp when said ramp is in said stored position having said strap forming a closed loop wherein said strap is configured to be extended over the tire of the vehicle for securing the tire of the vehicle to said cart.

2. The assembly according to claim 1, wherein:
   said plurality of rollers is disposed on a bottom surface of said panel, said plurality of rollers including a plurality of sets of rollers, said plurality of sets of rollers being arranged in a pair of rows which each extends substantially between a front end and a back end of said panel;
   said ramp is hingedly attached to said back end of said panel; and
   said wheel chock is positioned on a top surface of said panel, said wheel chock being positioned adjacent to said back end of said panel, said wheel chock having a pair of exterior surfaces which each angle upwardly from said top surface of said panel and intersect each other at a point such that said wheel chock has a triangular shape, said wheel chock extending laterally across said panel.

3. The assembly according to claim 1, wherein said first pressure sensor comprises:

a first control housing being attached to a bottom surface of said ramp;
   a first switch being positioned within said first control housing, said first switch being biased into an off position; and
   a first pin extending upwardly from said first control housing and extending through said ramp such that a head of said first pin is spaced from a top surface of said ramp, said first pin being depressed into said first control housing when said first pin is engaged such that said first switch is urged into an on position.

4. The assembly according to claim 3, wherein said second pressure sensor comprises:
   a second control housing being attached to a bottom surface of said panel;
   a second switch being positioned within said second control housing, said second switch being biased into an off position; and
   a second pin extending upwardly from said second control panel and extending through said panel such that a head of said second pin is spaced from a top surface of said panel, said second pin being depressed into said second control housing when said second pin is engaged such that said second switch is urged into an on position.

5. The assembly according to claim 4, wherein said visual alert comprises:
   a socket being attached to said panel, said socket being electrically coupled to each of said first switch and said second switch;
   a pole having a lower end and an upper end, said pole having a contact being attached to said lower end, said pole being insertable into said socket having said contact being in electrical communication with said socket;
   a light fixture being attached to said upper end of said pole wherein said light fixture is configured to be visible to the driver when said pole is inserted into said socket, said light fixture including a lens being comprised of a translucent material wherein said lens is configured to pass light though said lens;
   a light emitter being positioned within said light fixture wherein said light emitter is configured to emit light outwardly through said lens when said light emitter is turned on, said light emitter being electrically coupled to said contact on said lower end of said pole, said light emitter being turned on when said first switch is urged into said on position, said light emitter being turned off when said second switch is urged into said on position; and
   a power supply being positioned within said pole, said power supply being electrically coupled to said light emitter, said power supply comprising at least one battery.

6. The assembly according to claim 1, wherein:
   said clamp is positioned on a bottom surface of said ramp; and
   said strap has a first end being attached to a bottom surface of said panel at a point located adjacent to a front end of said panel, said strap having a second end being threadable through said clamp.

7. A vehicle cart assembly for facilitating a tire of a vehicle to be lifted off of a roadway, said assembly comprising:
   a cart having a panel and a plurality of rollers being rotatably disposed on said panel thereby facilitating said plurality of rollers to be positioned on a support surface having said panel being spaced from the support surface, said plurality of rollers being disposed on a bottom surface of said panel, said plurality of rollers including a plurality of sets of rollers, said plurality of sets of rollers being arranged in a pair of rows which each extends substantially between a front end and a back end of said panel;

a ramp being hingedly attached to said panel, said ramp being positionable in a deployed position having said ramp angling between said panel and the support surface wherein said ramp is configured to facilitate a tire of a vehicle to roll onto said cart, said ramp being positionable in a stored position having said ramp extending upwardly from said panel, said ramp being hingedly attached to said back end of said panel;

a wheel chock being attached to said panel wherein said wheel chock is configured to inhibit the tire of the vehicle from rolling off of said panel, said wheel chock being positioned on a top surface of said panel, said wheel chock being positioned adjacent to said back end of said panel, said wheel chock having a pair of exterior surfaces which each angle upwardly from said top surface of said panel and intersect each other at a point such that said wheel chock has a triangular shape, said wheel chock extending laterally across said panel;

a first pressure sensor being integrated into said ramp wherein said first pressure sensor is configured to be engaged by the tire of the vehicle when the tire of the vehicle rolls onto said ramp, said first pressure sensor comprising:
- a first control housing being attached to a bottom surface of said ramp;
- a first switch being positioned within said first control housing, said first switch being biased into an off position; and
- a first pin extending upwardly from said first control housing and extending through said ramp such that a head of said first pin is spaced from a top surface of said ramp, said first pin being depressed into said first control housing when said first pin is engaged such that said first switch is urged into an on position;

a second pressure sensor being integrated into said panel wherein said second pressure sensor is configured to be engaged by the tire of the vehicle when the tire of the vehicle rolls onto said panel, said second pressure sensor comprising:
- a second control housing being attached to said bottom surface of said panel;
- a second switch being positioned within said second control housing, said second switch being biased into an off position; and
- a second pin extending upwardly from said second control panel and extending through said panel such that a head of said second pin is spaced from a top surface of said panel, said second pin being depressed into said second control housing when said second pin is engaged such that said second switch is urged into an on position;

a visual alert being removably attached to said panel, said visual alert being in communication with said first pressure sensor and said second pressure sensor, said visual alert being turned on when said first pressure sensor is engaged wherein said visual alert is configured to alert a driver that the tire of the vehicle has begun rolling onto said ramp, said visual alert being turned off when said second pressure sensor is engaged wherein said visual alert is configured to alert the driver that the tire has rolled onto said panel thereby alerting the driver to stop the vehicle, said visual alert comprising:
- a socket being attached to said panel, said socket being electrically coupled to each of said first switch and said second switch;
- a pole having a lower end and an upper end, said pole having a contact being attached to said lower end, said pole being insertable into said socket having said contact being in electrical communication with said socket;
- a light fixture being attached to said upper end of said pole wherein said light fixture is configured to be visible to the driver when said pole is inserted into said socket, said light fixture including a lens being comprised of a translucent material wherein said lens is configured to pass light though said lens;
- a light emitter being positioned within said light fixture wherein said light emitter is configured to emit light outwardly through said lens when said light emitter is turned on, said light emitter being electrically coupled to said contact on said lower end of said pole, said light emitter being turned on when said first switch is urged into said on position, said light emitter being turned off when said second switch is urged into said on position; and
- a power supply being positioned within said pole, said power supply being electrically coupled to said light emitter, said power supply comprising at least one battery;

a clamp being attached to said ramp, said clamp being positioned on said bottom surface of said ramp; and a strap being coupled to said cart, said strap being insertable through said clamp when said ramp is in said stored position having said strap forming a closed loop wherein said strap is configured to be extended over the tire of the vehicle for securing the tire of the vehicle to said cart, said strap having a first end being attached to said bottom surface of said panel at a point located adjacent to said front end of said panel, said second end of said strap being threadable through said clamp.

* * * * *